United States Patent [19]

Malouf et al.

[11] Patent Number: 5,100,583
[45] Date of Patent: Mar. 31, 1992

[54] AQUEOUS BORON-CONTAINING COMPOSITIONS

[75] Inventors: George M. Malouf, Irvine; Edward L. Docks, Orange, both of Calif.

[73] Assignee: United States Borax & Chemical Corporation, Los Angeles, Calif.

[21] Appl. No.: 339,283

[22] Filed: Apr. 17, 1989

Related U.S. Application Data

[63] Continuation-in-part of Ser. No. 155,775, Feb. 16, 1988, Pat. No. 4,844,725, which is a continuation-in-part of Ser. No. 69,906, Jul. 6, 1987, abandoned.

[51] Int. Cl.$^5$ ................................................ C05G 3/02
[52] U.S. Cl. ................................................ 252/389.41
[58] Field of Search ................ 252/389.41, 68, 73

[56] References Cited

U.S. PATENT DOCUMENTS

| | | |
|---|---|---|
| 2,492,562 | 12/1949 | Fawcett . |
| 2,497,521 | 2/1950 | Trautman ................ 252/389.41 |
| 2,999,064 | 9/1961 | Sluhan . |
| 3,186,946 | 6/1965 | Sluhan . |
| 3,360,391 | 12/1967 | Thomson et al. ............ 252/389.41 |
| 3,719,598 | 3/1973 | King . |
| 4,007,029 | 2/1977 | Kenton . |
| 4,119,552 | 10/1978 | Davis et al. . |
| 4,155,739 | 5/1979 | Downer et al. . |
| 4,332,609 | 6/1982 | Ott . |
| 4,461,721 | 7/1984 | Goettsche . |
| 4,572,733 | 2/1986 | Howard . |

FOREIGN PATENT DOCUMENTS

| | | |
|---|---|---|
| 7171687 | 10/1987 | Australia . |
| 1082230 | 7/1980 | Canada . |
| 0046380 | 12/1985 | European Pat. Off. . |
| 0242753 | 10/1987 | European Pat. Off. . |
| 2140051 | 4/1982 | Fed. Rep. of Germany . |
| 3536417 | 4/1987 | Fed. Rep. of Germany . |
| 1036785 | 7/1966 | United Kingdom . |

OTHER PUBLICATIONS

Vukasovich, "Effects of Sodium Molybdate in Synthetic Metal Working Fluid", 3rd International Colloquim, Jan. 12-14, 1982.

Vukasovich, "Sodium Molybdate Corrosion Inhibition of Synthetic Metal Working Fluids", Lubrication Engineering, vol. 36, 12, pp. 708-712 (Dec. 1980).

Primary Examiner—Deborah L. Kyle
Assistant Examiner—Valerie Fee
Attorney, Agent, or Firm—James R. Thornton

[57] ABSTRACT

Aqueous boron-containing compositions containing about 40 to 85% of the reaction product of boric acid and alkylamine in a mole ratio of from 1.5:1 to 3:1, about 2 to 15% of an alkanol or alkylene glycol and the balance water. The compositions are useful as liquid fertilizer compositions, corrosion inhibitors and as pesticides.

11 Claims, No Drawings

AQUEOUS BORON-CONTAINING COMPOSITIONS

This is a continuation-in-part of our co-pending application Ser. No. 155,775 filed Feb. 16, 1988, now U.S. Pat. No. 4,844,725 which in turn is a continuation-in-part of our application, Ser. No. 069,906 filed July 6, 1987, now abandoned.

This invention relates to aqueous boron containing compositions, which are especially useful as liquid fertilizer compositions, as corrosion inhibitors for ferrous metals and as pesticides for preserving wood and controlling insects.

BACKGROUND OF THE INVENTION

Liquid compositions containing soluble boron have become increasingly popular in the last few years, primarily because of convenience of use in application to plants and soils and also for their ease in blending with other agricultural compositions, such as fertilizers and pesticides.

Boron is an essential micronutrient which is required by many crops and is therefore blended into many commercial fertilizer formulations, both liquid and granular It may also be used in liquid form as a foliar spray, to be applied to boron deficient crops and absorbed through the leaves.

Previously, liquid boron compositions were usually prepared by merely dissolving an inorganic borate such as the sodium borates in water. However, the relatively low solubility of the sodium borates limits the amount of boron in the aqueous solution to less than about 3%.

Recently, workers in the plant food art have proposed various liquid compositions containing boron at a level which is generally somewhat higher than that obtained by merely dissolving sodium borates in water. For example, Ott U.S. Pat. No. 4,332,609, describes a liquid fertilizer composition containing a polyborate compound which is formed by reacting boric acid with an alkanolamine or aliphatic polyamine. These compositions have a substantially higher amount of boron, but tend to be inconvenient to prepare and are relatively expensive.

Similarly, Howard U.S. Pat. No. 4,572,733, describes preparation of a boron composition for agricultural application, which involves first forming a solution of a boron compound such as the sodium borates in a water-miscible glycol solvent, dispersing fine particles of a second boron compound in the glycol solution and then grinding or micronizing to form a flowable composition containing a fine slurry of the borate.

U.S. Pat. No. 4,155,739, to Downer et al., describes a boron containing spray oil for use as a foliar application. The boron can be present in several forms but is based on various types of borate esters. Amine-borate adducts are described but it is clear that these are adducts prepared by reaction of a triester of boric acid with a complex high molecular weight amine. The boron content in the spray oils is relatively low, generally in the range of from 0.01 to 2% weight/volume.

Aqueous mixtures containing soluble boron have also been proposed for other uses such as, wood preservation and corrosion inhibition and in cutting fluids. For example, Gottsche et al. U.S. Pat. No. 4,461,721 describes a wood preservative which is an aqueous paste containing boric acid, organic amine and sodium polyborate. Sluhan U.S. Pat. No. 2,999,064 describes an aqueous cutting fluid composition containing a boric acid-alkanolamine reaction product which preferably also contains a long chain unsaturated fatty acid. Sluhan U.S. Pat. No. 3,186,946 and King U.S. Pat. No. 3,719,598 are also directed to cutting fluid compositions which contain amine borate salts in which the amines are complex alkanolamines or alkanoldiamines.

Vukasovich, *Lubrication Engineering*, Vol 36, 12, 708–712 (December 1980), and Vukasovich, 3rd International Colloquium, "Lubrication in Metal Working, Machining and Metal Forming Processes", Jan. 12–14, 1982, Technische Akademie Esslingen, Nellingen FDR, describes the effects of sodium molybdate in synthetic metal working fluids including "commercial amine borate-based" concentrates, which appear to be the alkanolamine borates of the Sluhan and King patents described above.

Canadian Patent 1082230, to Anger, describes polyborate solutions prepared by reacting alkanolamines or aliphatic polyamines with boric acid. These compositions are described as being useful as textile auxiliaries such as yarn moistening agents, as metal working agents and for liquid cleaners and disinfectants.

Davis et al. U.S. Pat. No. 4,119,552 discloses the use of alkylammonium borates as boronating agents for preparing complex boronated alkylphenoxy alkanoic acid amide lubricant additives.

Other patents of interest are German patent specification 21 40 051 to Gottsche which describes boric acid-amine compositions in water, as well as U.S. Pat. No. 2,492,562 which describes preparation of a sulfurization catalyst for fatty oils. The catalyst is prepared by heating a boro-ethylene glycol complex with a primary aliphatic amine containing at least 10 carbon atoms at an elevated temperature to give a catalyst which is a waxy-solid material.

See also U.S. Pat. No. 4,007,029 which describes liquid fertilizer compositions based on anhydrous ammonia solutions of a trace element, which may include boric acid.

Further, European Patent Specification 0 046 380, describes a liquid wood-treating composition, consisting of a solution of boric acid in ethylene glycol, which may optionally contain water.

SUMMARY OF THE INVENTION

This invention provides aqueous boron-containing solutions containing from about 7 to 13% boron, which comprise about 40 to about 85% of the reaction product of boric acid with at least one alkylamine in a mole ratio of from 1.5:1 to about 3:1, about 2% to about 15% of an alcohol which is selected from the lower alkanols and lower alkylene glycols, and the balance water.

DESCRIPTION OF THE INVENTION

The lower alkanols and alkylene glycols have from 1 to about 6 carbon atoms. Examples of suitable lower alkanols and alkylene glycols include methanol, ethanol, n-propanol, isopropanol, n-butanol, ethylene glycol, butylene glycol, propylene glycol, hexylene glycol and the like. The alkylamines also contain a lower alkyl group having from 1 to about 6 carbon atoms. The monoalkylamines are preferred since most compositions based on dialkyl and trialkyl amines are relatively unstable at higher boron levels. Typical alkylamines include methylamine, ethylamine, n-propylamine, butylamine, n-amylamine, n-hexylamine, cyclohexylamine, and the like.

The compositions of this invention are readily prepared by mixing the amine, water and alkanol or alkylene glycol in a covered vessel and slowly adding the appropriate amount of boric acid. The mixture is then stirred until all the boric acid is dissolved, generally about 1 to 2 hours. The amine may be dissolved in water prior to addition or added as a gas. Heating is usually not required, although in some cases, it may be advisable in order to accelerate dissolving of the boric acid. However, if heating is employed, it generally is at a temperature of not more than about 60° C.

In preferred compositions according to this invention, the aqueous solution contains about 60 to about 70% of the alkylamine-boric acid salt, about 4 to 12% of the alkanol or alkylene glycol and about 17 to 26% water. Monomethylamine is the most preferred alkyl amine and ethylene glycol is the most preferred alkylene glycol.

The compositions of the invention are miscible with water in all proportions. They are also miscible with some alcohols, such as methanol and ethanol, but are only slightly soluble in organic solvents such as toluene, xylene and mineral spirits.

The following examples illustrate preparation of representative compositions of this invention.

EXAMPLES 1-16

Aqueous amine borate compositions were prepared by mixing the appropriate amine (dissolved in water) and alkanol or glycol in a stirred covered vessel and slowly adding the indicated amount of boric acid. The resultant mixture is then stirred at room temperature until all the boric acid has dissolved (about 1-2 hours). Amounts are percentage by weight.

| Example | Amine | Amt. | Alkanol or Glycol | Amt. | Boric Acid (Amt.) | Water (Amt.) | W/W % B |
| --- | --- | --- | --- | --- | --- | --- | --- |
| 1 | methyl | 11.8 | ethylene G | 6.3 | 58.0 | 23.9 | 10 |
| 2 | methyl | 11.8 | ethylene G | 4.2 | 58.0 | 26.0 | 10 |
| 3 | methyl | 13.4 | ethylene G | 8.4 | 58.0 | 20.2 | 10 |
| 4 | methyl | 12.6 | ethylene G | 10.5 | 58.0 | 18.9 | 10 |
| 5 | ethyl | 33.6 | propylene G | 12.0 | 40.0 | 14.4 | 7 |
| 6 | methyl | 13.4 | butylene G | 8.4 | 58.0 | 20.2 | 10 |
| 7 | methyl | 13.4 | MeOH | 8.4 | 58.0 | 20.2 | 10 |
| 8 | methyl | 12.6 | MeOH | 10.5 | 58.0 | 18.9 | 10 |
| 9 | methyl | 9.0 | ethylene G | 6.0 | 40.0 | 45.0 | 7 |
| 10 | ethyl | 17.6 | EtOH | 6.3 | 68.6 | 7.5 | 12 |
| 11 | ethyl | 23.5 | EtOH | 8.4 | 58.0 | 10.1 | 10 |
| 12 | isopropyl | 23.6 | ethylene G | 8.4 | 58.0 | 10.0 | 10 |
| 13 | n-butyl | 30.0 | ethylene G | 10.0 | 40.0 | 20.0 | 7 |
| 14 | n-hexyl | 24.3 | propylene G | 8.0 | 51.7 | 16.0 | 9 |
| 15* | cyclohexyl | 21.5 | hexylene G | 7.1 | 57.2 | 14.2 | 10 |
| 16 | n-butyl | 27.2 | hexylene G | 9.0 | 45.8 | 18.0 | 8 | ethylene G = ethylene glycol
MeOH = methanol
propylene G = propylene glycol
EtOH = ethanol
butylene G = butylene glycol
hexylene G = hexylene glycol
*heated to about 60° C.

The formulations may be applied as foliar sprays to trees, crops and to soil in undiluted form or they may be diluted such as with water. The undiluted form contains a high level of available boron. For example, Examples 1, 3 and 10 contain 1.08, 1.08 and 1.3 pound, respectively, of boron per gallon. The normal application rate to crops and trees is generally in the range of about 0.5 to 4 pounds of B per acre, depending on the requirements of the crop species. Typical crops to which boron is applied are peanuts, cotton, alfalfa, apples, sugar beets, corn, and many vegetables. In tests on representative crops, the compositions of this invention have been found to be non-phytotoxic at normal application rates.

When used as a source of boron for mixed fertilizer formulations, the compositions of this invention are added to a liquid or granular formulation in an amount sufficient to provide about 0.5 to about 2% B. These may be subsequently diluted with water by the user for application to crops and soils. The compositions may also be diluted with pesticides such as insecticides, especially for foliar application.

The aqueous borate compositions of this invention also have utility as corrosion inhibitors, such as additives for machining fluids, to prevent corrosion of ferrous metals. They can also be used as wood preservatives, being taken up rapidly by sawn lumber and logs whether green or dry. The resultant treated wood is resistant to insect and fungal attack. When used as corrosion inhibitors, they are generally in diluted form, such as at a concentration to give about 0.2% to 1.0% boron. When used as wood preservatives, they may be used in the undiluted, concentrated form or diluted, such as with water.

Insects, such as termites, may also be controlled by application of the compositions to infested wood or soil. Generally, diluted compositions, such as with water, are used for such applications.

The following examples illustrate use of the compositions of this invention as corrosion inhibitors.

EXAMLE 17

Three compositions of the above-identified examples were tested as corrosion inhibitors for cast iron. The procedure is similar to that described by M. S. Vukasovich in a paper presented at the 3rd International Colloquium "Lubrication in Metal Working, Machining and Metal Forming Processes" (1982) Technische Akademie Esslingen, Nellingen FDR. The compositions of Examples 1,3 and 10 were diluted with standard corrosive water to give concentrations of 0.3, 0.4 and 0.5% boron. Two grams of +20 mesh cast iron filings were placed in a 50 ml. beaker and 25 ml. of the diluted formulation was added. After standing for 15 minutes, the solutions were decanted and the iron filings placed on filter paper resting on a watch glass. The assembly was transferred to a closed chamber maintained at 88% relative humidity and 23° C. After 4 hours the samples were removed from the chamber, the iron filings discarded and the degree of rust spotting on the filter paper observed. A corrosivity rating of 1 to 6 was recorded, with 1 meaning no rust spotting the paper and 6 meaning gross rusting. The results were as follows:

| Example | 0.3% B | 0.4% B | 0.5% B |
| --- | --- | --- | --- |
| 1 | 3 | 2 | 1.5 |
| 3 | 2 | 1.5 | 1 |
| 10 | 2 | 2 | 2 |

-continued

| Example | 0.3% B | 0.4% B | 0.5% B |
| --- | --- | --- | --- |
| A | 4 | 3 | 2 |
| B | 4 | 1.5 | 1.5 |
| Water | 6 | 6 | 6 |

Example A is an ethanolamine borate composition of U.S. Pat. No. 4,332,609 and Example B is sodium tetraborate pentahydrate diluted with water as indicated.

Various modifications and changes of the invention can be made and, to the extent that such variations incorporate the spirit of this invention, they are intended to be included within the scope of the appended claims.

What is claimed is:

1. The method of inhibiting corrosion of ferrous metals which comprises contacting said metal with an aqueous solution of an alkylammonium borate composition comprising about 40% to about 85% of the reaction product of boric acid and lower alkylamine in a mole ratio of from 1.5:1 to about 3:1, about 2% to about 15% of an alcohol selected from the lower alkanols and lower alkylene glycols, and the balance water, said alkylammonium borate composition being diluted with water to provide about 0.2 to about 1.0% by weight boron.

2. The method according to claim 1 in which said alkylamine is a monoalkylamine.

3. The method according to claim 1 in which said alcohol is a lower alkylene glycol.

4. The method according to claim 1 in which said alkylamine is methylamine.

5. The method according to claim 1 in which said alkylammonium borate composition comprises about 60 to about 70% of said reaction product of boric acid and alkylamine, about 4 to 12% of said alcohol and about 17 to 26% water.

6. The method according to claim 5 in which said alkylamine is methylamine and said alcohol is ethylene glycol.

7. The method according to claim 1 in which said alcohol is ethylene glycol.

8. The method according to claim 1 in which said alkylamine is ethylamine and said alcohol is ethanol.

9. The method according to claim 1 in which said alkylammonium borate composition comprises about 12 percent methyl amine, 6 percent ethylene glycol, 58 percent boric acid and the balance water, said percentages by weight.

10. The method according to claim 1 in which said alkylammonium borate composition comprises about 13 percent methyl amine, 8 percent ethylene glycol, 58 percent boric acid and the balance water, said percentages by weight.

11. The method according to claim 1 in which said alkylamine is n-hexylamine and said alcohol is propylene glycol.

* * * * *